US006854302B2

(12) United States Patent
Zapushek et al.

(10) Patent No.: US 6,854,302 B2
(45) Date of Patent: Feb. 15, 2005

(54) PNEUMATIC TOOL LOCK

(75) Inventors: John Zapushek, Racine, WI (US); Christopher R. Irgens, Elm Grove, WI (US)

(73) Assignee: Master Lock Company, Milwaukee, WI (US)

( * ) Notice: Subject to any disclaimer, the term of this patent is extended or adjusted under 35 U.S.C. 154(b) by 0 days.

(21) Appl. No.: 10/192,626

(22) Filed: Jul. 10, 2002

(65) Prior Publication Data

US 2003/0015007 A1 Jan. 23, 2003

Related U.S. Application Data

(60) Provisional application No. 60/304,399, filed on Jul. 10, 2001.

(51) Int. Cl.[7] .......................... E05B 73/00; F16K 35/00

(52) U.S. Cl. ..................... 70/34; 70/58; 70/61; 70/178; 70/232; 70/386; 137/383

(58) Field of Search ............................... 70/34, 58, 61, 70/175–180, 232, 386; 137/382, 380, 383

(56) References Cited

U.S. PATENT DOCUMENTS

| | | | | | |
|---|---|---|---|---|---|
| 1,692,826 | A | * | 11/1928 | Ganz | 70/231 |
| 1,890,744 | A | * | 12/1932 | Noonan | |
| 1,998,050 | A | * | 4/1935 | Gasdorf | 138/89.1 |
| 3,525,242 | A | * | 8/1970 | Young | |
| 3,995,459 | A | * | 12/1976 | Weeks et al. | 70/13 |
| 4,375,200 | A | * | 3/1983 | Bertani et al. | 70/259 X |
| 4,881,388 | A | * | 11/1989 | Pruim | 70/175 |
| 4,969,342 | A | * | 11/1990 | Marchiori | 70/49 |
| 5,170,650 | A | * | 12/1992 | Kortenbrede | 70/49 |
| 5,197,314 | A | * | 3/1993 | Stillwagon et al. | 70/386 |
| 5,214,945 | A | * | 6/1993 | Martin | 70/232 |
| 5,447,043 | A | * | 9/1995 | Hwang | 70/49 |
| 5,501,555 | A | * | 3/1996 | Muetschele et al. | 70/15 X |
| 5,664,445 | A | * | 9/1997 | Chang | 70/34 |
| 5,829,280 | A | * | 11/1998 | Chen | 70/49 |
| 6,209,575 | B1 | * | 4/2001 | Graziano et al. | 137/383 |
| 6,496,101 | B1 | * | 12/2002 | Stillwagon | 70/278.7 X |
| 6,543,260 | B2 | * | 4/2003 | Koy et al. | 70/34 |
| 6,595,031 | B2 | * | 7/2003 | Wilson et al. | 70/233 |
| 6,634,195 | B2 | * | 10/2003 | Lenz et al. | 70/178 |
| 2002/0104338 | A1 | * | 8/2002 | Koy et al. | 70/34 |

FOREIGN PATENT DOCUMENTS

| | | | | |
|---|---|---|---|---|
| JP | 112572 | * | 4/1990 | 70/419 |

* cited by examiner

*Primary Examiner*—Lloyd A. Gall
(74) *Attorney, Agent, or Firm*—Calfee, Halter & Griswold LLP

(57) ABSTRACT

A tool lock, especially useful in preventing theft or unauthorized use of a tool. The tool lock has a housing in which a lock cylinder assembly and locking balls are disposed. The tool lock housing has an opening at one end in which a portion of a tool, such as a pneumatic fitting on a pneumatic tool, may be inserted and secured by the engagement of the locking balls. The tool lock housing may further include a shackle portion which can be used in conjunction with a cable, either integral or separate, padlock, or chain to secure the tool lock to another object.

11 Claims, 6 Drawing Sheets

FIG. 1
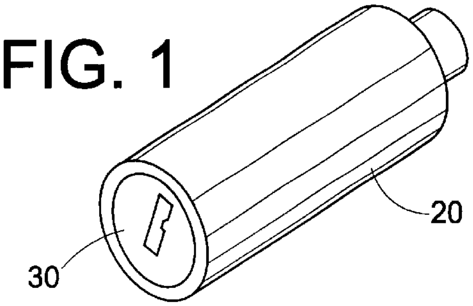
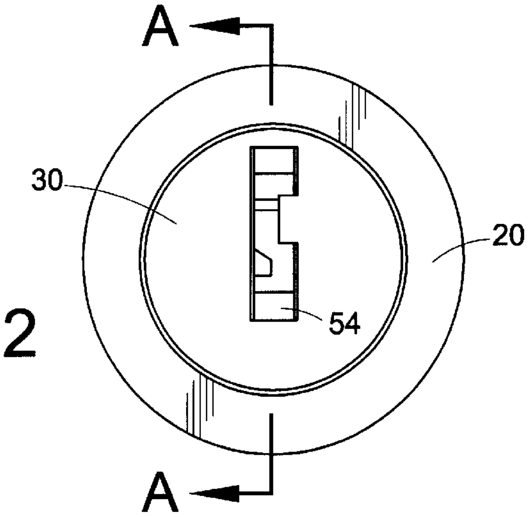
FIG. 2
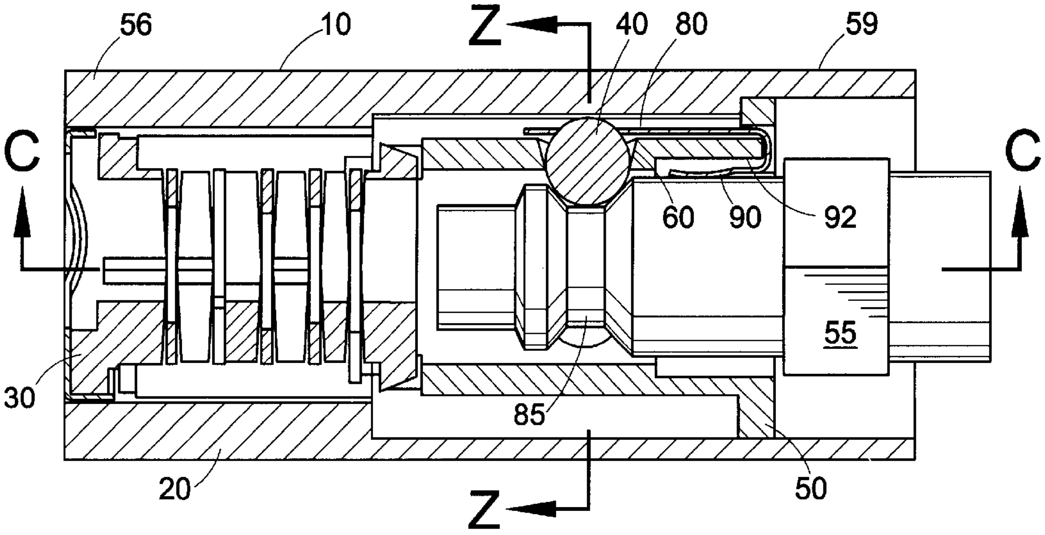
FIG. 3

FIG. 4
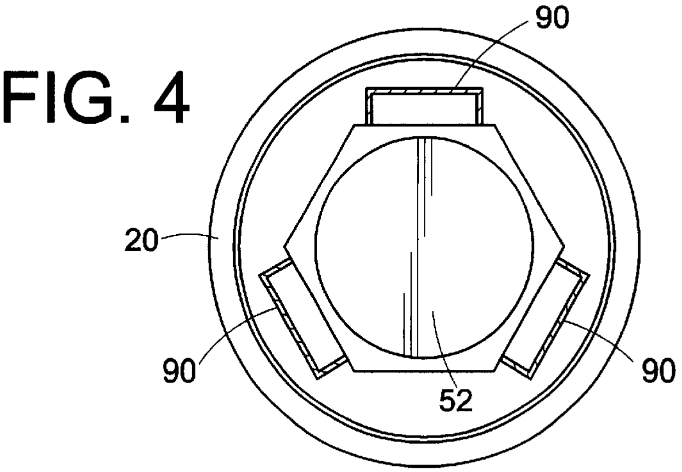
FIG. 5
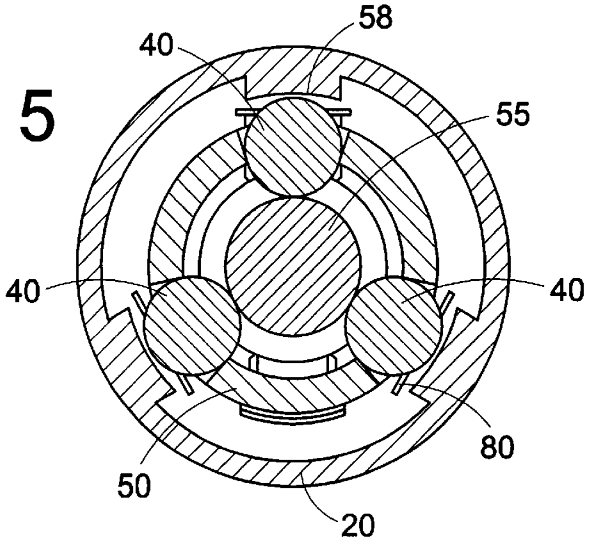
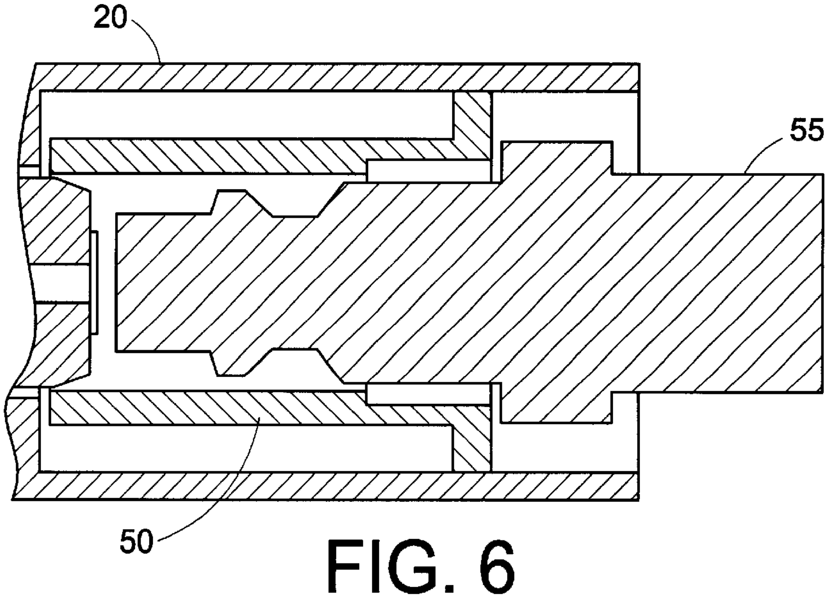
FIG. 6

PNEUMATIC TOOL LOCK

CROSS-REFERENCE TO RELATED APPLICATIONS

This invention claims priority to U.S. Provisional Patent Application Ser. No. 60/304,399, filed Jul. 10, 2001.

FIELD OF THE INVENTION

The invention relates to a lock for tools, and more specifically to a tool lock that engages a pneumatic fitting on a pneumatic tool thereby securing the tool from theft and/or unauthorized use.

BACKGROUND OF THE INVENTION

Pneumatic tools, such as, for example, nail guns, staple guns, impact wrenches, and body grinders are commonly found on contractor sites, in assembly plants, in automotive repair workshops, and in some homes. These tools can be fairly expensive to replace and may be dangerous, especially if used by an unauthorized person, such as a child.

Currently, pneumatic tools are protected from theft or unauthorized use by locking them in safe boxes with a padlock, or using a specially manufactured lock that prevents use of the tool. However, not all tools can be secured in such fashion. In particular, some tools are left out in the open for anyone to take or use simply because a locking mechanism has not been provided. In other circumstances, tools remained unsecured because the locking mechanism provided cannot be adapted to secure the specific tool.

Therefore, it is desirable to provide a lock that can be adapted to fit a wide variety of pneumatic tools and various pneumatic tool fittings. It is further desirable to provide a lock for pneumatic tools that is capable of preventing unauthorized use, theft, or both.

SUMMARY OF THE INVENTION

A lock for securing a pneumatic tool from unauthorized use or theft is provided. In one embodiment, the lock includes a lock housing with a cylinder assembly disposed therein. The lock also includes an inner surface that retains a set of spring-loaded locking balls. The locking balls engage a groove in a pneumatic fitting once inserted into the lock housing. The lock further includes a set of raised surfaces that engage the locking balls when in the locked position and thereby prevent the locking balls from withdrawal from engagement with the pneumatic fitting.

In one embodiment the lock includes a shackle portion which is integral with the lock housing and provides a means for securing the lock to another object. In another embodiment, a cable is included as an integral portion of the shackle.

In another embodiment of the pneumatic tool lock the lock contains an interchangeable cylinder that allows the lock cylinder to be rekeyed.

Another aspect of the present invention provides for a method of securing a pneumatic tool. The method includes locking the pneumatic tool fitting within a lock body. In one embodiment, the method includes securing the lock to another object by placing a cable or padlock through a shackle that is integral with the lock housing.

Still, other advantages and benefits of the present tool lock will be apparent to those skilled in the art upon reading and understanding of the following detailed description.

BRIEF DESCRIPTION OF THE DRAWINGS

The tool lock of the present invention may be more readily understood by reference to the following drawings.

While certain embodiments are shown as illustrative examples of the tool lock, the scope of this application should not be construed as limited to these illustrative examples.

FIG. 1 is a perspective view of the pneumatic tool lock of the present application;

FIG. 2 is an end view of the pneumatic tool lock showing the keyway and cylinder assembly;

FIG. 3 is a cross-sectional view taken through A—A and showing the tool lock in the locked position;

FIG. 4 is an end view of the pneumatic tool lock showing the inner housing wherein the pneumatic tool fitting is inserted;

FIG. 5 is a cross-sectional view of the pneumatic tool lock taken through Z—Z;

FIG. 6 is a cross-section view of the pneumatic tool lock taken through C—C;

DETAILED DESCRIPTION OF THE INVENTION

Figure 7:
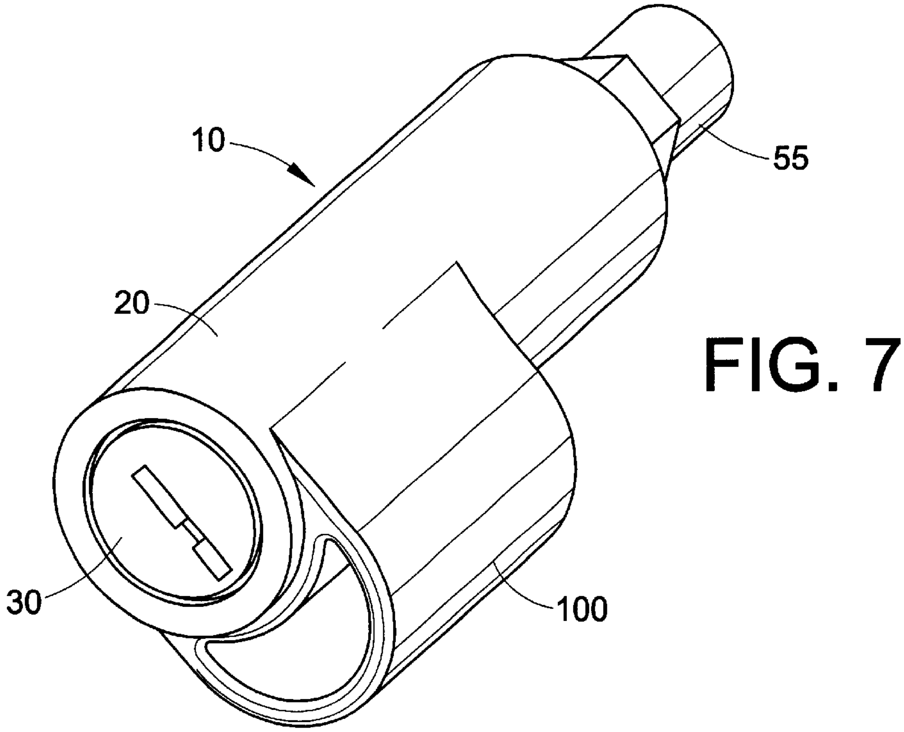
FIG. 7 is a perspective view of the pneumatic tool lock incorporating the integral shackle feature.
Figure 8:
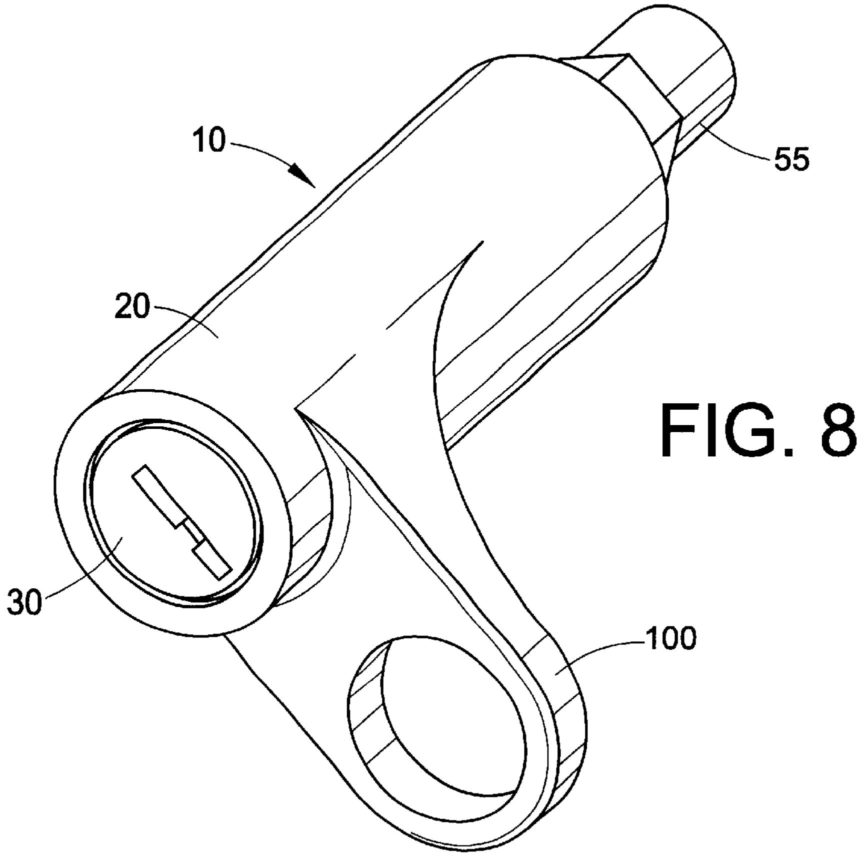
FIG. 8 is a perspective view of another embodiment of the pneumatic tool lock which incorporates the integral shackle feature.
Figure 9:
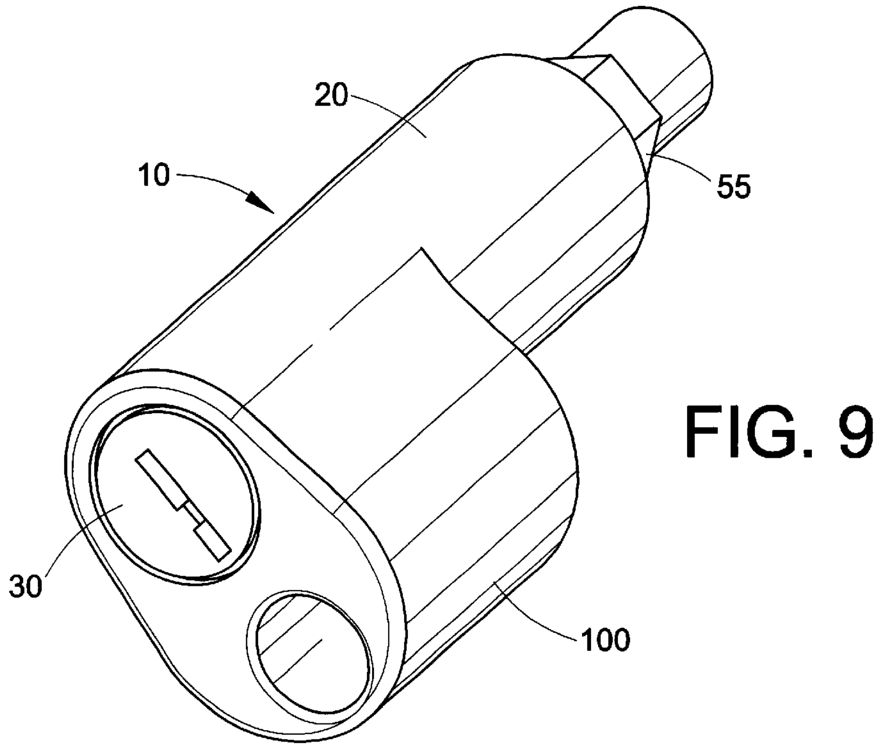
FIG. 9 is a perspective view of another embodiment of the pneumatic tool lock which incorporates the integral shackle feature.
Figure 10:
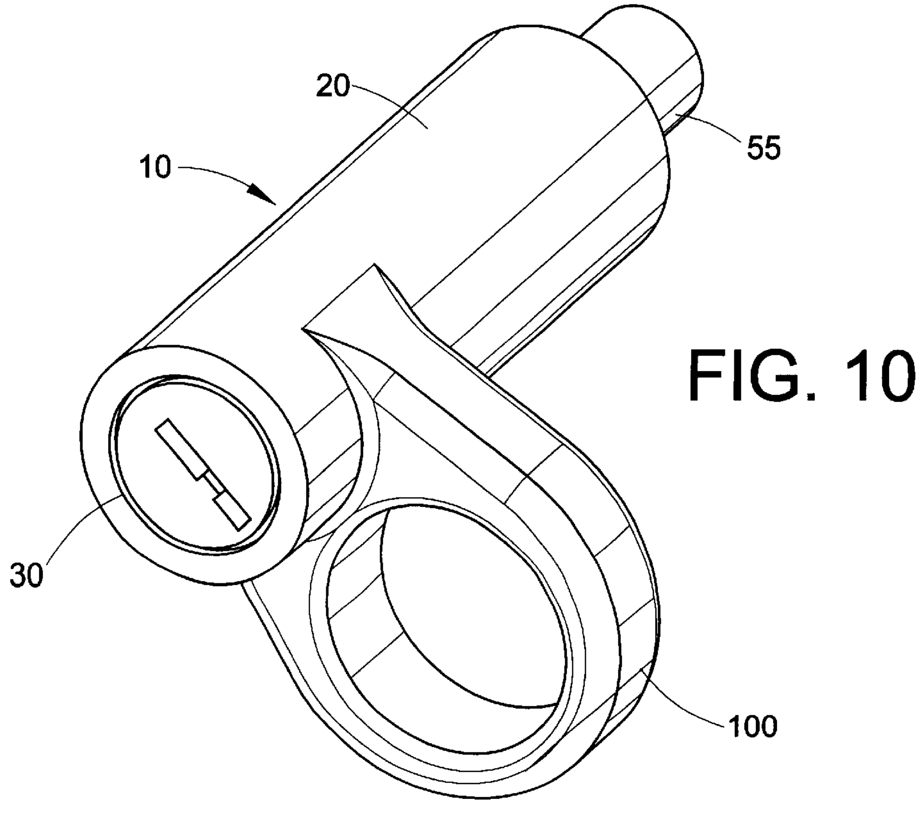
FIG. 10 is a perspective view of another embodiment of the pneumatic tool lock which incorporates the integral shackle feature.
Figure 11:
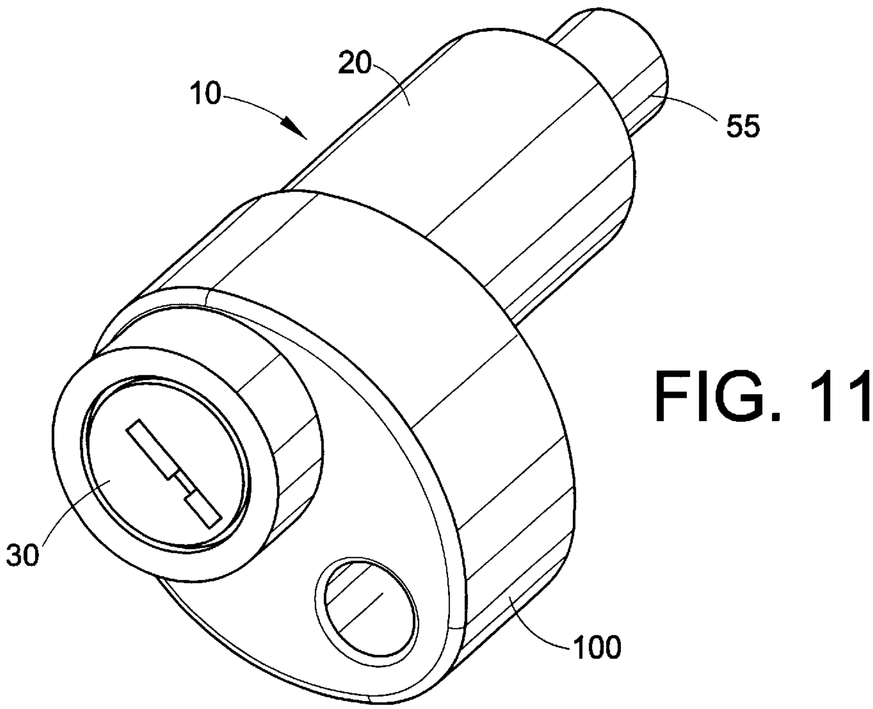
FIG. 11 is a perspective view of another embodiment of the pneumatic tool lock which incorporates the integral shackle feature.

The present invention is a lock for securing pneumatic tools, generally referenced as 10. The lock includes lock housing 20, cylinder assembly 30, and one or more spring-loaded locking balls 40 located within a locking cavity of the lock housing, three are shown in the embodiment shown in FIG. 5. The lock housing 20, generally is cylindrical with an inner housing 50 located therein. In should be appreciated that the lock body may be various shapes, sizes and configuration providing that it provides the same functional aspects as described herein. The lock housing 20 is generally a hardened metal that provides security for the internal components of the lock 10. The lock housing may be provided wit an external coating of material, such as, for example, rubber or plastic if an external metal surface is not desired. Such an external coating can prevent the lock from scratching other surfaces, such as the surface of the tool to which the look is applied. The cylinder assembly 30 is housed within the lock housing 20 such that keyway 54 is accessible from the end 56 of the lock 10. The lock housing 20 contains locking ball retention ridges 58 that engage the locking balls 40 and thereby secure them in the locked position, as discussed in greater detail herein below.

The inner housing 50 is disposed within the lock housing 20 at the opposite end 59 of the lock 10 from the cylinder 30.

The inner housing 50 is generally cylindrical with an opening 52 for receiving a pneumatic fitting 55. The inner housing 50 also has cutaway portions 60 which house the locking balls 40 which are retained by ball springs 80. As discussed further below, the locking balls 40 engage the pneumatic fitting 55 of the pneumatic tool (not shown) and secure the fitting 55 within the inner housing 50 of the lock 10.

The cylinder assembly 30 can be a variety of shapes, sizes, and configurations, and may incorporate a number of different locking mechanisms. In one embodiment, an interchangeable wafer tumbler locking cylinder is employed. The interchangeable wafer locking cylinder may be similar to the invention disclosed in co-pending U.S. patent application Ser. No. 10/187,727, filed on Jul. 2, 2002 entitled PICK RESISTANT WAFER TUMBLER LOCK WITH SIDEBARS, which claims priority to U.S. provisional patent application No. 60/302,643 filed on Jul. 2, 2001 entitled PICK RESISTANT WAFER LOCK WITH SIDEBAR, the entire disclosure of which is hereby incorporated by reference. Other lock cylinders may be used, such as, for example, the rekeyable cylinder assembly shown in FIG. 13 which incorporates a conventional trap door 72 for interchanging the lock cylinder. The trap door 72 includes a trap door screw and a trap door nut that allows for the removal of the cylinder 30. The rekeyable feature disclosed in the above-referenced patent applications and in the cylinder including the trap door feature is an additional aspect of the present tool lock that would allow the pneumatic tool lock to be rekeyed in the event of theft of the correct key. Further, this feature allows a set of pneumatic tool locks to be keyed the same, thereby allowing a master key to be useable on an entire set of tool locks. This feature can prevent the need for a tool operator to have a different key for each of the different tools in which a tool lock is applied.

The inner housing 50 includes a shoulder (the surface of housing 50 which faces fitting 55 in FIG. 3) and an inner surface contains cutaway portions 60 that position the locking balls 40 for retention by ball springs 80. The locking balls 40 are dimensioned to engage the coupling groove 85 in the pneumatic fitting 55. The ball springs 80 retain and engage the locking balls 40 and provide a spring force that biases the locking balls 40 towards the center of the lock 10 and into engagement with the coupling groove 85 in the pneumatic fitting 55, when inserted into the inner housing 50 of the lock. In one embodiment, the ball springs 80 are fitted around the inner housing 50 such that centering clips 90 are formed along the interior wall 92 of the inner housing 50. The centering clips 90 engage the pneumatic fitting 55 as the fitting is slid into the opening 52 of the inner housing 50. The centering clips 90 are spring-loaded to bias the pneumatic fitting 55 into the center of the inner housing opening 52, thereby ensuring that each locking ball 40 is secured within the coupling groove 85 of the pneumatic fitting 55. Furthermore, use of centering clips 90 will stabilize the lock 10 on the fitting 55 and provide for a tighter fit. While the centering clips 90 are generally shown as part of the balls springs 80, it should be appreciated that the centering clips may be a separate piece from ball springs 80.

The inner housing 50 is dimensioned to receive one of the several standard sizes of pneumatic fittings 55. As such, the depth and other dimensions of the inner housing 50 are selected in order to enable operational alignment of the locking balls 40 upon engagement of an appropriately sized pneumatic fitting 55 to correspond to the dimensions of the inner housing 50. As such, multiple sizes of the lock 10 are contemplated; however the user of the lock may also change the size of the pneumatic fitting 55, and the mating fitting on the air supply hose of line, to accommodate the lock 10.

Figure 12:
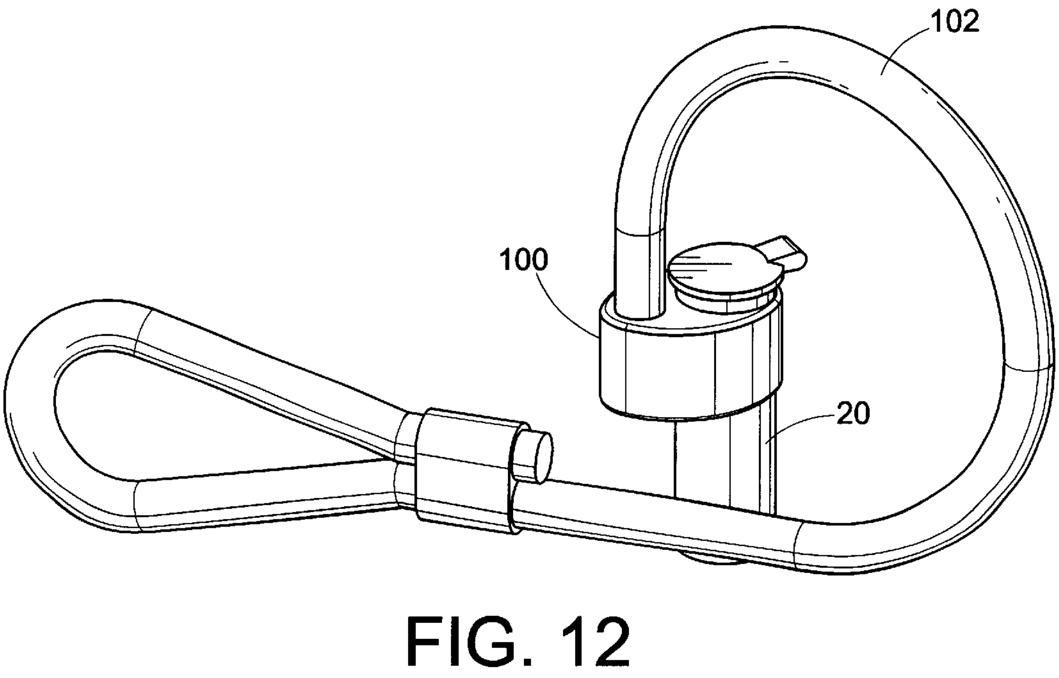
FIG. 12 is a perspective view of a pneumatic tool lock incorporating the integral cable feature.
Figure 13:
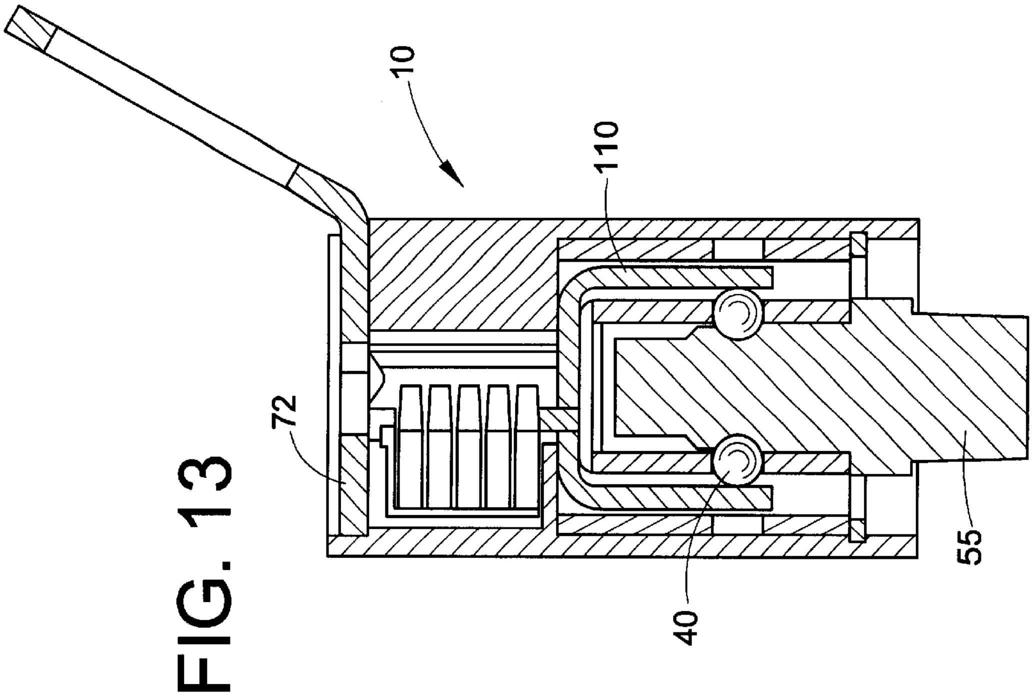
FIG. 13 is a cross-sectional view of another embodiment of the pneumatic tool lock incorporating a trap door feature and a cylinder extension.

As shown in FIGS. 7–11, the lock housing 20 may further include a shackle 100 that is integral with the lock housing 20 and provides a means for securing the lock 10 to another object, such as, for example, a workshop bench or table, to prevent theft. As shown in FIGS. 7–11, the shackle 100 may be formed, in one piece or fixed with the lock housing 20, in various shapes, sizes and configurations depending on how the lock 10 is to be secured to another object. Alternatively an integral shackle 100 maybe used which is movable with respect to the lock housing 20. For example, the shackle shown in FIG. 13 is secured to a hinge which allows for the displacement of the shackle 100 with respect to the lock h&sing 20. In some embodiments, the shackle 100 can be used in conjunction with a padlock, which may be used in conjunction with a separate chain or cable, while in other embodiments the shackle 100 can be used in conjunction with a theft-resistant cable. In the embodiment shown in FIG. 12, a theft-resistance cable 102 is integral with the lock housing 20 and shackle 100 to provide a means for securing the lock 10 to an object. The cable 102 may take on a variety of sizes, and may provide simple fastening means, an adjustable length, or a separate locking feature, It is further contemplated that a locking feature of the cable 102 may be integral with the lock housing 20 and may further be functionally coupled to the cylinder assembly 30 of the pneumatic tool lock 10. Bach of these aspects of the present invention are considered apart of the scope of the invention, by themselves or in combination with other aspects of the invention.

To engage the lock 10, the pneumatic fitting 55 of the pneumatic tool is inserted into the opening 52 of the inner housing 50 of the lock, the centering clips 90 guiding the fitting into proper alignment with the looking balls 40, As the pneumatic fitting 55 is inserted into the inner housing 50, the configuration of the surface of the pneumatic fitting 55, along with the spring force provided by the ball springs 80, allows the locking balls 40 to move along the surface of the pneumatic fitting 55 and to detent into to retaining groove 85 of the pneumatic fitting 55. A key (not shown) is inserted into the keyway 54 and rotated, thereby rotating the cylinder assembly 30 into the locked position. The cylinder assembly 30 further rotates the inner housing 50 until the locking balls 40 are aligned with the locking ball retention surfaces 58. So aligned, the locking balls 40 are secured into engagement with the retention groove 85 as the locking ball retention surfaces 58 prevent the locking balls 40 from retraction from the retention groove 85 into the inner housing 50. In the locked position, as illustrated in FIG. 3, the pneumatic tool (not shown but engaged and secured with the pneumatic fitting 55 ), is secured from unauthorized use as the lock 10 secures the pneumatic fitting. If so desired, the lock 10 can then be secured to another object by securing the shackle 100 with a padlock, chain, cable or combinations thereof, as described above.

In order to disengage the lock 10, the key is inserted into the keyway 54 and rotated such as to rotate the cylinder assembly 30 into the unlocked position. In doing so, the inner housing 50 rotates to remove the locking balls 40 from alignment with the locking ball retention surfaces 58. The locking balls 40 are thus free to retract into the cutaway portions 60 of the inner housing 50. However, since the locking balls 40 are spring biased towards the center of the lock by bail springs 80, the locking balls 40 remain in engagement with the retention groove 85 until the pneumatic fitting 55 is pulled from the inner housing opening 52 of the lock 10. As the pneumatic fitting 55 is pulled from the inner housing opening 52, the retention groove 85 provides a camming surface that allows the locking balls 40 to be removed from the retention groove 85 and thereby allows the pneumatic fitting 55 to be removed from the lock 10.

Figure 14:
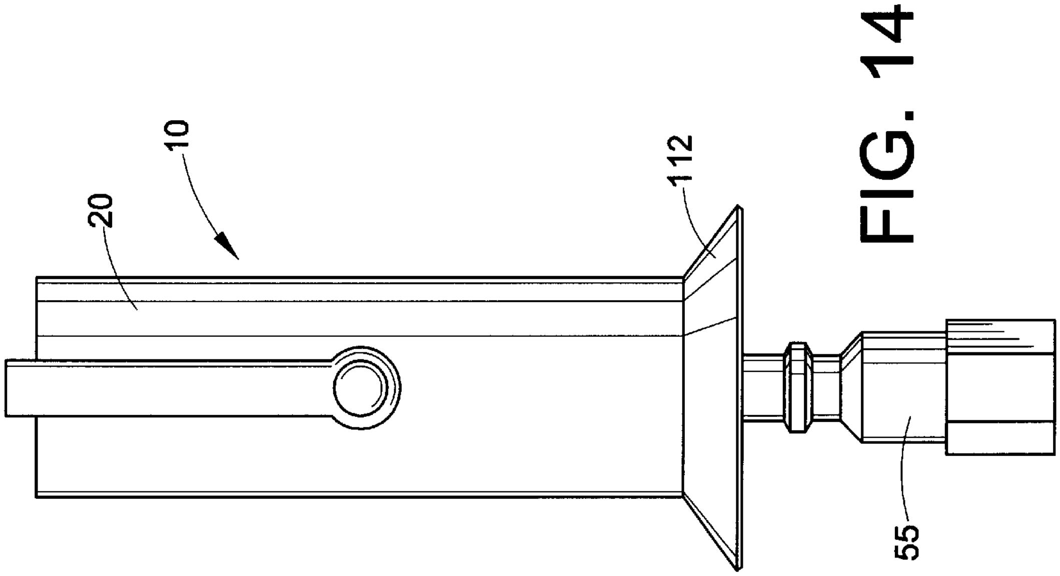
FIG. 14 is an embodiment of the pneumatic tool lock that incorporates a shield.

In other embodiment of the invention, the inner housing 50 also includes a separate cylinder extension 110, which can rotate between the inner housing 50 and the lock housing 20 and provide the ball retention surfaces in the locked position. As shown in FIG. 14, the lock 10 may also include a shield 112, which is affixed at the end 59 of the lock 10 and fits over part of pneumatic tool, or abuts against the surface of the pneumatic tool, thereby preventing access to the screws or bolts that retaining the pneumatic fitting 55. The shield 112 would thereby prevent bi-passing the fitting 55 and pneumatic tool lock 10 resulting in theft or unauthorized use of the lock.

What is claimed is:

1. A lock for preventing theft or unauthorized use of a tool comprising:

a lock housing;

a lock cylinder assembly disposed within said lock housing;

two or more locking balls disposed within the lock housing;

ball springs that engage the locking balls and bias the locking balls towards the center of the lock housing, wherein said ball springs further comprise centering clips that engage a pneumatic fitting; and an opening in said look housing, wherein a portion of a tool can be inserted;

wherein said locking balls are retained with respect to the portion of the tool inserted within said opening in said lock housing when the lock cylinder is in a locked position.

2. A lock for preventing theft or unauthorized use of a tool comprising;

a lock housing;

a lock cylinder assembly disposed within said lock housing;

two or more looking balls disposed within the look housing;

a pneumatic tool fitting, wherein said pneumatic tool fitting is secured to said tool; and an opening in said lock housing, wherein said pneumatic tool fitting is secured;

wherein said locking balls are positioned to engage the pneumatic tool fitting in a locked position and are positioned to disengage the pneumatic tool fitting in an unlocked position.

3. The lock of claim 2, wherein said lock cylinder assembly is a wafer tumbler cylinder assembly incorporating pick-resistance features.

4. The lock of claim 2, wherein the lock housing further comprises locking ball retention projections, wherein said projections engage the locking balls when in a locked position.

5. The lock of claim 2, wherein the lock housing further comprises a shackle for securing the lock to another object.

6. The lock of claim 2 further comprising an integral cable for securing the lock to another object.

7. The lock of claim 2, further comprising a shield that is affixed to a pneumatic tool fitting receiving end of the lock, wherein said shield abuts the tool and prevents access to the portion of the tool secured by said lock.

8. The lock of claim 2, wherein the cylinder assembly is interchangeable.

9. The lock of claim 8, wherein the cylinder assembly includes a trap door mechanism for removing said lock cylinder from the lock housing.

10. A lock for preventing theft or unauthorized use of a tool comprising:

a lock housing;

a lock cylinder assembly disposed within said lock housing;

two or more locking balls disposed within the lock housing;

two or more looking ball retention surfaces;

an inner housing with two or more cutaway portions;

an opening in said lock housing, wherein a portion of a tool can be inserted; and ball springs that engage the locking balls and bias the locking balls towards the center of the lock housing wherein said inner housing is rotated between i) a locked position wherein said locking balls are engaged by said locking ball retention surfaces and are secured into engagement with said portion of said tool inserted into said lock housing opening; and ii) an unlocked position wherein said locking balls are disengaged from said locking bail retention surfaces and can be removed from engagement with said portion of said tool inserted into said lock housing opening.

11. A lock comprising:

a lock housing including a locking cavity therein, wherein said locking cavity includes an internal housing comprising a shoulder for mating engagement with a pneumatic fitting when in a locked position;

a rotatable lock cylinder disposed within said lock housing;

two or more locking balls disposed within the locking cavity of said lock housing a means for selectively retaining said locking balls in interlocking engagement with a tool, wherein said means for selectively retaining said locking balls includes;

an inner surface that houses said locking balls within a set of openings;

ball springs that engage said locking balls and bias the locking balls toward the center of the locking cavity; and locking ball retention surfaces that engage said locking balls when said lock is in the locked position and prevent said locking balls from withdrawing from engagement with said tool.

* * * * *